(12) United States Patent
Yuan

(10) Patent No.: US 12,338,052 B1
(45) Date of Patent: Jun. 24, 2025

(54) DOUBLE-LAYER CUSHIONING STRUCTURE AND A PREPARATION PROCESS THEREOF

(71) Applicant: NINGBO ANSOL CABINET CO., LTD., Zhejiang (CN)

(72) Inventor: Limin Yuan, Zhejiang (CN)

( * ) Notice: Subject to any disclaimer, the term of this patent is extended or adjusted under 35 U.S.C. 154(b) by 0 days.

(21) Appl. No.: 18/776,174

(22) Filed: Jul. 17, 2024

(30) Foreign Application Priority Data

Jun. 17, 2024 (CN) .......................... 202410779873.0

(51) Int. Cl.
| | | |
|---|---|---|
| *B65D 81/05* | (2006.01) | |
| *B29C 49/00* | (2006.01) | |
| *B29D 24/00* | (2006.01) | |
| *B29L 24/00* | (2006.01) | |

(52) U.S. Cl.
CPC ......... *B65D 81/058* (2013.01); *B29D 24/002* (2013.01); *B29C 49/0031* (2013.01); *B29K 2995/0046* (2013.01); *B29L 2024/00* (2013.01)

(58) Field of Classification Search
CPC .. B29D 24/00; B29D 24/002; B29D 49/0031; B29K 2995/0046; B29L 2024/00; B65D 81/05; B65D 81/058
USPC .......................................... 206/523, 586–594
See application file for complete search history.

(56) References Cited

U.S. PATENT DOCUMENTS

| | | | | |
|---|---|---|---|---|
| 3,181,693 A | * | 5/1965 | Freistat .................. | A45C 13/02 206/523 |
| 3,889,805 A | * | 6/1975 | Korten .................. | B65D 81/022 206/523 |
| 3,994,399 A | * | 11/1976 | Numata ............... | B65D 5/5045 206/586 |
| 6,298,989 B1 | * | 10/2001 | Chu ..................... | B65D 81/133 206/592 |

FOREIGN PATENT DOCUMENTS

| | | | |
|---|---|---|---|
| CN | 213385330 U | * | 6/2021 |
| CN | 219447666 U | * | 8/2023 |

* cited by examiner

*Primary Examiner* — Bryon P Gehman

(57) ABSTRACT

A double-layer cushioning structure and a preparation process thereof, relating to technical field of packaging products. It includes a buffer cover. Hollow double-wall structure in buffer cover play a good buffer role, when an outer wall is deformed inwards by impact of external force, reactive force will offset impact of external force to achieve buffer effect; first reinforcing ribs and second reinforcing ribs strengthens strength of inner and outer walls, thereby reducing wall thickness, softening product, and saving processing materials; first connecting holes, second connecting holes, and support holes between inner and outer walls can better support inner and outer walls, and longitudinally strengthen buffer cover, and further ensure overall structural strength of buffer cover; soft material is provided on a wall surface of a product protection groove, to further soften wall surface in contact with the product to protect surface of product from being scratched.

10 Claims, 3 Drawing Sheets

DOUBLE-LAYER CUSHIONING STRUCTURE AND A PREPARATION PROCESS THEREOF

1. TECHNICAL FIELD

The invention belongs to the technical field of packaging products, specifically relates to double-layer cushioning structure and a preparation process thereof.

2. BACKGROUND ART

Currently on the market for home appliances such as refrigerators, washing machines, air conditioners, TVs, kitchen hoods, as well as a variety of daily necessities, furniture, boxes and cabinets, industrial and other products suitable for foam protection, most of them adopts foam protective packaging, the principle of which is to make use of excellent cushioning and softness of the foam to protect products from damage in the process of transportation and handling, however, foam has the following serious defects:
1. Not environmentally friendly, foam products is unvironmental-friendly, as foam is not only difficult to degrade, but also contains a lot of toxic substances and can not pass the environmental protection test, and the foam is easy to break into small particles to form micro-plastics that can not be recycled, causing serious harm to animals and nature;
2. Although the foam has good cushioning properties, but the strength is limited, and very brittle, when it's used to protect heavy product, it's easy to break and lose the protective function. Therefore, there are certain limitations when foam is used to protect very heavy products;
3. Foam belongs to extremely flammable material, which can burns instantly as long as catching spark, and it is difficult to extinguish, so there are fire hazards no matter where it is piled up;
4. Foam is very light in volume and quality, small in strength, occupies much space for storage, and is not suitable for long-distance transportation.

3. SUMMARY OF THE INVENTION

In order to solve the technical problem, the technical solution provided by the invention is: a double-layer cushioning structure and a preparation process thereof, comprising a buffer cover, wherein the buffer cover is a double-wall structure, and a cavity is provided between the double walls of the buffer cover; one side of the buffer cover is provided with a product protection groove, on an inner wall of the product protection groove is provided with first reinforcing ribs, and an other side of the buffer cover is provided with second reinforcing ribs; in the product protection groove is provided with a plurality of first connecting holes, and the buffer cover is provided with a plurality of second connecting holes and a plurality of support holes. The inner wall of the product protection groove is affixed or rubber-coated or polymerized with a layer of soft material.

As a preferred technical solution of the invention, the shape of the product protection groove can be square, round, oval, polygonal and these shapes can be connected to one entirety or scattered.

As a preferred technical solution of the invention, the product protection groove is shaped as one of concave, flat or convex, or a combination of two or more than three.

As a preferred technical solution of the invention, in each of four corners of the buffer cover is provided with at least one second connecting hole, and the second connecting hole and first connecting hole are one of through hole or counter bore.

As a preferred technical solution of the invention, the buffer covers can be arranged in two opposite positions, so that the product protection grooves are connected into one entirety.

As a preferred technical solution of the invention, support holes are provided in an interior of the product protection groove; the support holes, second connecting holes and first connecting holes are used to support the double walls of the buffer cover, the buffer cover is made of ductile material, the support holes, second connecting holes and first connecting holes are shaped in one of round, square and polygonal shapes, and all of them are one of through holes or counter bores;

The first reinforcing ribs are located in the inner wall of the product protection groove, and the second reinforcing ribs are located in an outer wall of the buffer cover;

There are a plurality of first reinforcing ribs, second reinforcing ribs, and support holes, a plurality of first reinforcing ribs being connected to each other to one entirety and a plurality of second reinforcing ribs being connected to each other to one entirety;

A periphery of the buffer cover is inwards concaved into a curved surface.

As a preferred technical solution of the invention, stepped grooves are provided on the curved surface of the periphery of the buffer cover.

A process for preparing a double-layer cushioning structure, comprising the following steps:
  S1. blow molding the double-wall structure; the matched raw materials to be blow molded are blow molded by utilizing a blow mold matching the shape of the buffer cover, to obtain a double-wall structure matching the shape of the product to be packaged, which is a packaging product with cushioning function.
  S2. provision of reinforcing ribs on inner and outer wall surfaces, the first reinforcing ribs, second reinforcing ribs are provided on inner and outer walls of the blow-molded buffer cover, respectively;
  S3. arrangement of connecting holes between the inner and outer walls, and the first connecting holes, second connecting holes, and support holes are set inside the blow-molded buffer cover;
  S4. provision of soft material on the inside wall, after the buffer cover is blow molded, soft material can be rubber-coated or affixed or polymerized to wrap a layer of soft material around interior of the product protection groove.

As a preferred technical solution of the invention, in said S2, a plurality of first reinforcing ribs and second reinforcing ribs are provided on inner and outer walls of the buffer cover; a plurality of first reinforcing ribs are connected to each other to one entirety, a plurality of second reinforcing ribs are connected to each other to one entirety, and a plurality of grooves are provided between a plurality of first reinforcing ribs and between a plurality of second reinforcing ribs.

As a preferred technical solution of the invention, in said S3, in the product protection groove of the buffer cover is provided with a plurality of first connecting holes and support holes, in each of four corners of the buffer cover is provided with at least one second connecting hole, inner and outer walls on two sides of the cavity are supported via the support holes, first connecting holes and second connecting holes.

In said S4, the inner wall of the product protection groove is rubber-coated or affixed or polymerized with soft material to soften the inner wall in contact with the product so as to protect surface of the product to be protected from being scratched.

Compared with the prior art, the invention provides a double-layer cushioning structure and a preparation process thereof, and has the following advantages:

For the double-layer cushioning structure and a preparation process thereof, hollow double-wall structure in the buffer cover play a good buffer role, when an outer wall is deformed inwards by impact of external force, the reactive force will offset impact of external force to achieve buffer effect; arrangement of first reinforcing ribs and second reinforcing ribs strengthens strength of inner and outer walls, thereby reducing wall thickness, softening product, and saving processing materials; arrangement of first connecting holes, second connecting holes, and support holes between the inner and outer walls can better support the inner and outer walls, and longitudinally strengthen the buffer cover, and further ensure overall structural strength of the buffer cover, thereby further reducing wall thickness, softening product, saving materials, and reducing processing costs; soft material is provided on a wall surface of a product protection groove, to further soften wall surface that is in contact with the product being protected, and is used to protect surface of the product from being scratched.

4. BRIEF DESCRIPTION OF ACCOMPANY DRAWINGS

Figure 1:
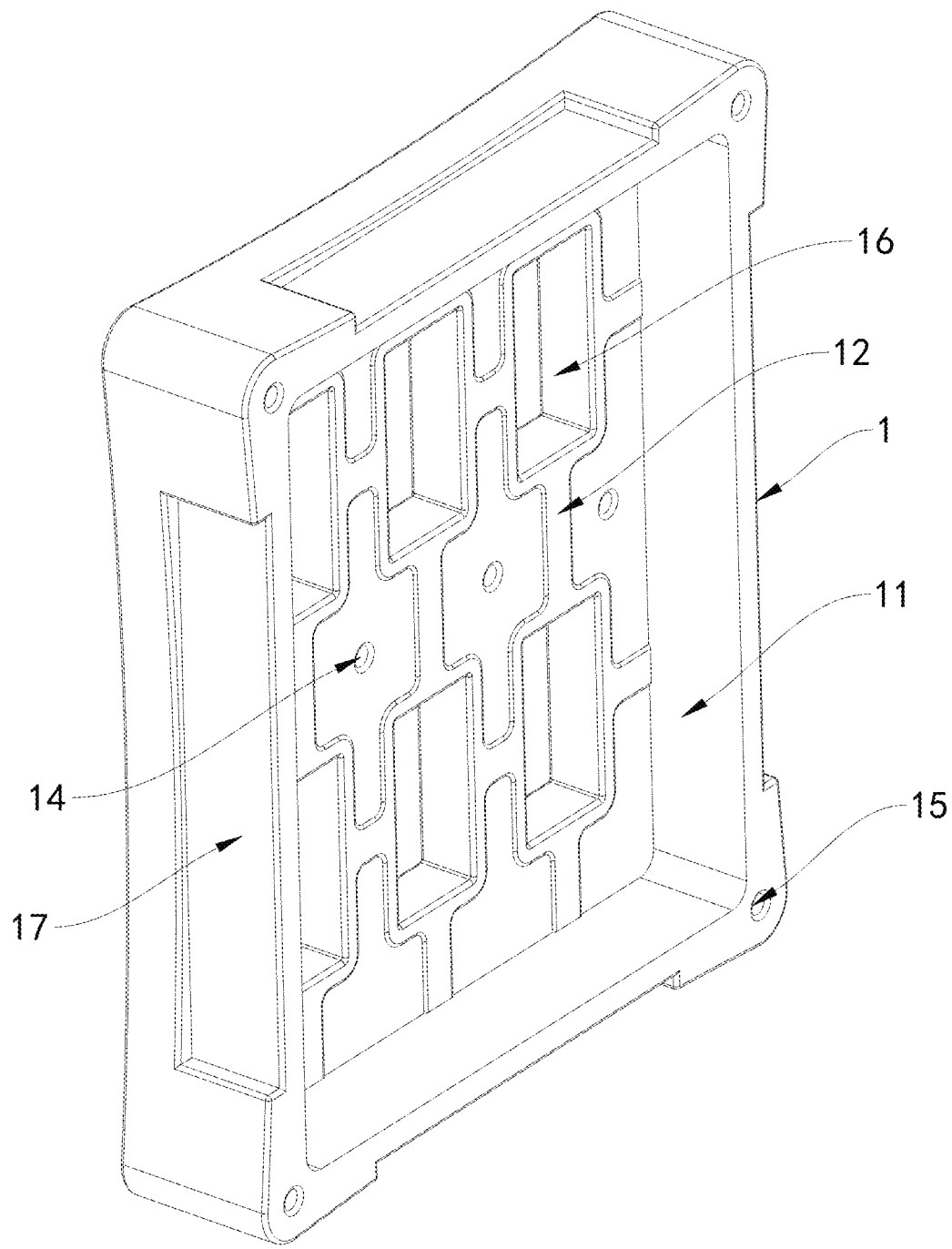
FIG. 1 is a structural diagram of the buffer cover of a double-layer cushioning structure and a preparation process thereof provided by the invention.

As shown in the accompanying drawings: 1 buffer cover, 11 product protection groove, 12 first reinforcing rib, 13 second reinforcing rib, 14 first connecting hole, 15 second connecting hole, 16 support hole, 17 stepped groove, 18 soft material.

5. SPECIFIC EMBODIMENT OF THE INVENTION

In order to enable a more detailed understanding of the features and technical contents of the disclosed embodiments, the following detailed description of the realization of the disclosed embodiments is provided in conjunction with the accompanying drawings, which are attached for illustrative purposes only and are not intended to limit the disclosed embodiments. In the following technical description, a plurality of details are adopted for ease of explanation to provide a full understanding of the disclosed embodiments. However, one or more embodiments can still be implemented without these details. In other cases, familiar structures and devices may be shown in a simplified manner in order to simplify the accompanying drawings.

The terms "first", "second", and the like in the specification and claims of the embodiments and in the above-described drawings are used to distinguish between similar objects and need not be used to describe a particular order or sequence. It should be understood that the data used may be interchangeable in appropriate situation to describe embodiments of the invention herein. In addition, the terms "including" and "having" and any variations thereof are intended to cover non-exclusive inclusion.

In embodiments of the invention, the terms "upper," "lower," "inner," "middle," "outside", "front", "back", etc. indicate an orientation or positional relationship based on the orientation or positional relationship shown in the accompanying drawings. These terms are primarily intended to better describe embodiments of the invention, and are not intended to qualify that the indicated devices, elements, or components must have a particular orientation, or be constructed and operated in a particular orientation. Moreover, some of the above terms may be used to indicate other meanings in addition to an orientation or positional relationship, for example, the term "on" may also be used to indicate a certain dependency or connection relationship in some cases. To a person of ordinary skill in the art, the specific meanings of these terms in the embodiments of the invention may be understood according to the specific circumstances.

In addition, the terms "setting", "connecting", and "fixing" are to be broadly construed. For example, a "connection" may be a fixed connection, a removable connection, or a monolithic construction; it may be a mechanical connection or an electrical connection; it may be a direct connection or an indirect connection through an intermediate medium; or it may be an internal connection between two devices, elements, or components. To one of ordinary skill in the art, the specific meaning of the above terms in the embodiments of the invention may be understood on a case-by-case basis.

Unless otherwise indicated, the term "a plurality" denotes two or more.

It is noted that embodiments and features of embodiments of the invention may be combined with each other without conflict.

Figure 2:
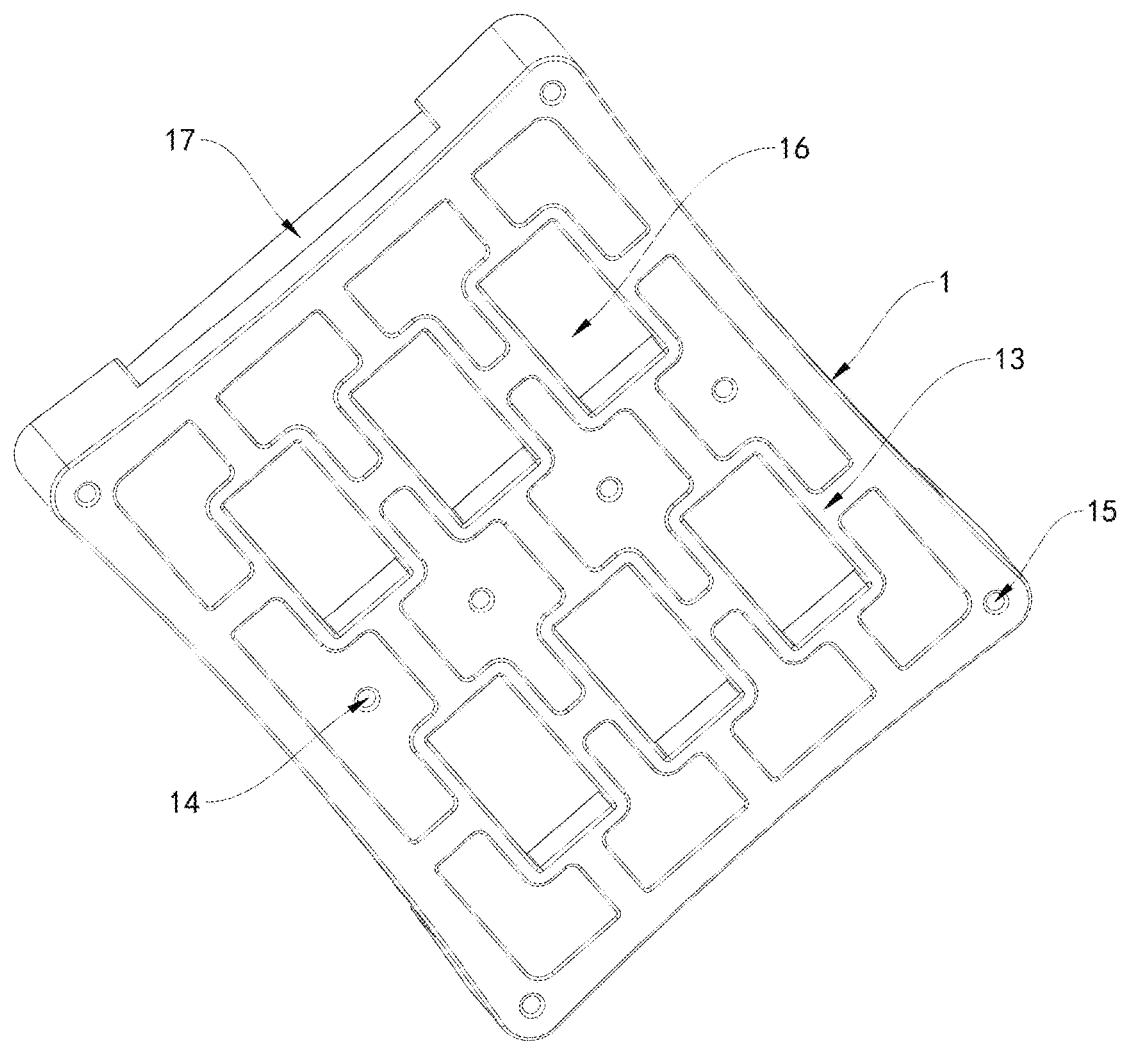
FIG. 2 is a side view of the buffer cover of a double-layer cushioning structure and a preparation process thereof provided by the invention.
Figure 3:
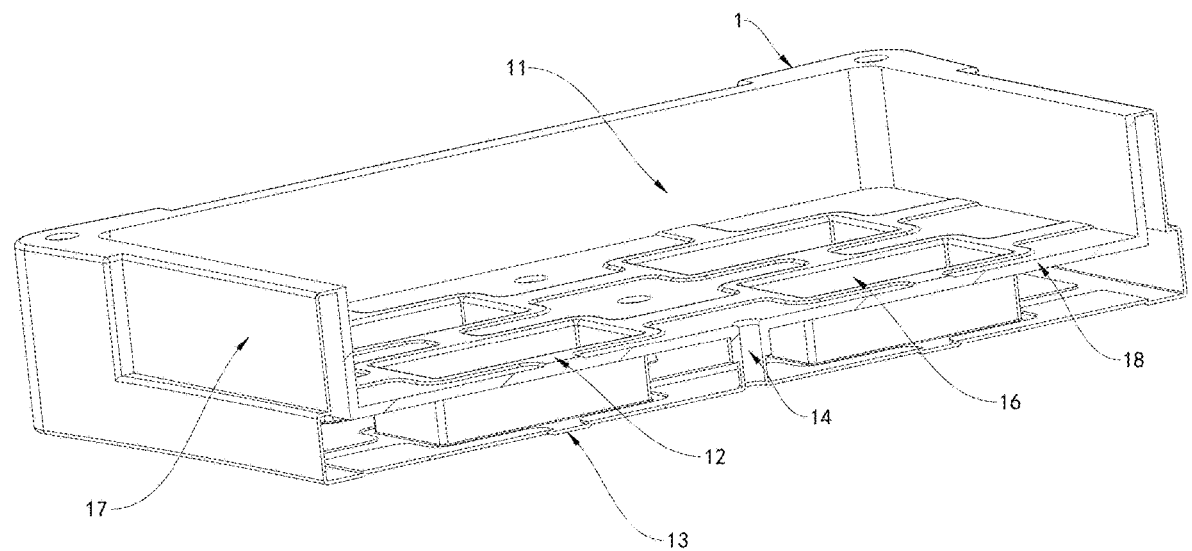
FIG. 3 is a sectional view of the buffer cover of a double-layer cushioning structure and a preparation process thereof provided by the invention.
Figure 4:
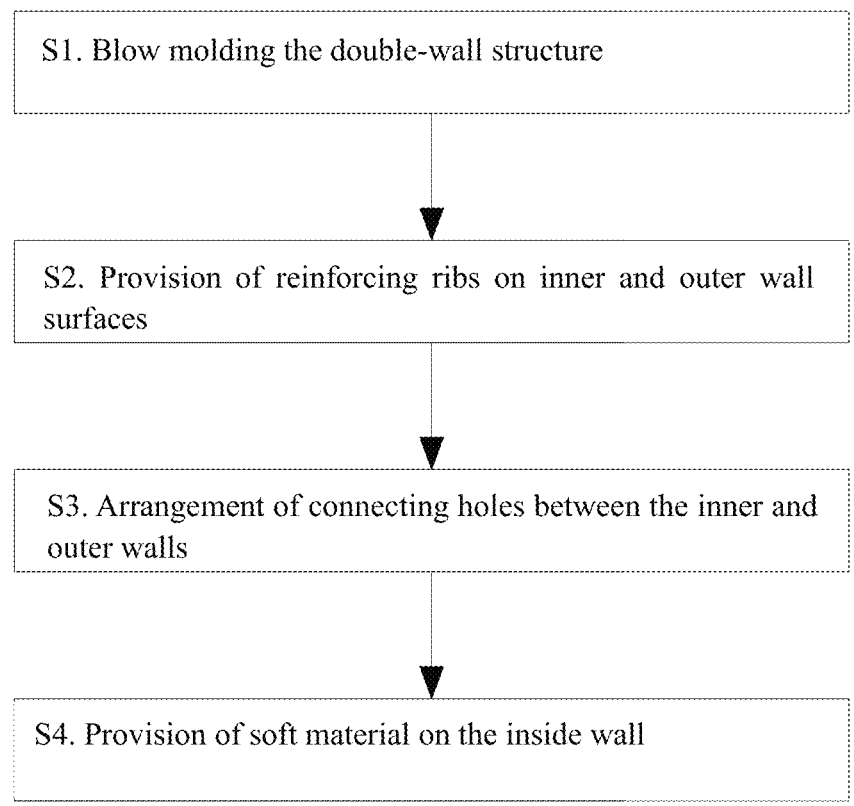
FIG. 4 is a process flow diagram of a double-layer cushioning structure and a preparation process thereof provided by the invention.

With reference to FIG. 1 to FIG. 4, a double-layer cushioning structure and a preparation process thereof, comprising a buffer cover 1, wherein the buffer cover 1 is a double-wall structure, and a cavity is provided between the double walls of the buffer cover 1; one side of the buffer cover 1 is provided with a product protection groove 11, on an inner wall of the product protection groove 11 is provided with first reinforcing ribs 12, and an other side of the buffer cover 1 is provided with second reinforcing ribs 13; in the product protection groove 11 is provided with a plurality of first connecting holes 14, and the buffer cover 1 is provided with a plurality of second connecting holes 15 and a plurality of support holes 16. The inner wall of the product protection groove 11 is affixed or rubber-coated or polymerized with a layer of soft material 18. The hollow double-wall structure in the buffer cover 1 plays a good buffer role, when an outer wall is deformed inwards by impact of external force, the reactive force will offset impact of external force to achieve buffer effect; arrangement of first reinforcing ribs 12 and second reinforcing ribs 13 strengthens strength of inner and outer walls, thereby reducing wall thickness, softening product, and saving processing materials; arrangement of first connecting holes 14, second connecting holes 15 between the inner and outer walls can better support the inner and outer walls, and longitudinally strengthen the buffer cover 1, and further ensure overall structural strength of the buffer cover 1.

As a specific technical solution of the embodiment, the shape of the product protection groove 11 can be square, round, oval, polygonal and these shapes can be connected to one entirety or scattered.

As a specific technical solution of the embodiment, the product protection groove 11 is shaped as one of concave, flat or convex, or as a combination of two or more than three.

As a specific technical solution of the embodiment, in each of four corners of the buffer cover 1 is provided with at least one second connecting hole 15, and the second connecting hole 15 and first connecting hole 14 are one of through hole or counter bore.

As a specific technical solution of the embodiment, the buffer covers 1 can be arranged in two opposite positions, so that the product protection grooves 11 are connected into one entirety, which are connected through second connecting holes 15 with pins or bolts, or tape winding, and can be made into a buffer protection box to use.

As a specific technical solution of the embodiment, support holes 16 are provided in an interior of the product protection groove 11; the support holes 16, second connecting holes 15 and first connecting holes 14 are used to support the double walls of the buffer cover 1; the first reinforcing ribs 12 are located in the inner wall of the product protection groove 11 and can be arranged on any face of the inner wall according to needs, and the second reinforcing ribs 13 are located in an outer wall of the buffer cover 1 and can be arranged on any face of the outer wall according to needs; after the buffer cover 1 is molded through blow molding process, a closed cavity is formed inside, and the inner and outer walls on two sides of the cavity are supported via the support holes 16, first connecting holes 14 and second connecting holes 15 to ensure the overall stability of the buffer cover 1.

As a specific technical solution of the embodiment, the buffer cover 1 is made of ductile material, the support holes 16, second connecting holes 15 and first connecting holes 14 are shaped in one of round, square and polygonal shapes, and all of them are one of through holes or counter bores; arrangement of support holes 16, second connecting holes 15, and first connecting holes 16 can better support the inner and outer walls, and strengthen the whole buffer cover 1, thereby further reducing wall thickness, softening the buffer cover 1, saving materials, and reducing processing costs; the ductile material may be plastic or sheet of metal with a high degree of elasticity.

As a specific technical solution of the embodiment, there are a plurality of first reinforcing ribs 12, second reinforcing ribs 13, and support holes 16, a plurality of first reinforcing ribs 12 being connected to each other to one entirety and a plurality of second reinforcing ribs 13 being connected to each other to one entirety; a plurality of grooves are provided between a plurality of first reinforcing ribs 12 and between a plurality of second reinforcing ribs 13; the grooves are provided to reduce contact area of the inner and outer walls of the buffer cover 1 with the product and outer packaging box.

As a specific technical solution of the embodiment, a periphery of the buffer cover 1 is inwards concaved into a curved surface, so as to facilitate leaving a gap in the box and make it easy to take out the buffer cover 1; at the same time, it can also play a reinforcing effect on side surfaces; stepped grooves 17 are provided on the curved surface of the periphery of the buffer cover 1 so that there will be an acting point when taking out the buffer cover 1, and it can also play a reinforcing effect on side surfaces; the design of the curved surface makes the space between periphery of the buffer cover 1 and outer packaging box hollow, to reduce the contact area and make it easy to pack, and at the same time, the hollow gap facilitates stretching hand to take out the buffer cover 1, and the curved surface design of the surface has a reinforcing effect; step grooves 17 are provided so that there will be an acting point when taking out the buffer cover 1, and it can also play a reinforcing effect on side surfaces.

As a specific technical solution of this embodiment, first connecting holes 14 and second connecting holes 15 are mainly used to support the inner and outer walls, and can longitudinally strengthen the buffer cover 1; when the buffer cover 1 is used in special occasions when through hole is not allowed to transmit light or leak water, or when the buffer cover 1 still need that the inner and outer walls can not be completely connected, first connecting holes 14, second connecting holes 15 and support holes 16 can be made into counter bores; bottoms of the counter bores are connected or placed at a certain intervals, and the outer wall still has the function of supporting inner and outer walls when it deforms inward for a certain distance, and strength of the buffer cover 1 can be adjusted by adjusting the depth of the counter bores; and two buffer covers 1 can be assembled together through the second connecting holes 15 with bolts.

A process for preparing a double-layer cushioning structure, comprising the following steps:

S1. blow molding the double-wall structure; the matched raw materials to be blow molded are blow molded by utilizing a blow mold matching the shape of the buffer cover 1, to obtain a double-wall structure matching the shape of the product to be packaged, which is a packaging product with cushioning function. The hollow double-wall structure in the buffer cover 1 play a good buffer role, when an outer wall is deformed inwards by impact of external force, the reactive force will offset impact of external force to achieve buffer effect.

S2. provision of reinforcing ribs on inner and outer wall surfaces, the first reinforcing ribs 12, second reinforcing ribs 13 are provided on inner and outer walls of the blow-molded buffer cover 1, respectively; transverse reinforcement processing is performed on inner and outer double-layer wall surfaces of the blow-molded buffer cover 1 via the first reinforcing ribs 12 and second reinforcing ribs 13, to achieve the same strength effect so as to significantly reduce thickness of inner and outer double-layer wall surfaces of the blow-molded buffer cover 1, save materials, and soften the buffer cover 1, conducive to exerting cushioning performance.

S3. arrangement of connecting holes between the inner and outer walls, and the first connecting holes 14, second connecting holes 15, and support holes 16 are set inside the blow-molded buffer cover, so that supporting of the inner and outer walls can be strengthened longitudinally as a whole.

S4. provision of soft material on the inside wall, after the buffer cover 1 is blow molded, soft material can be rubber-coated or affixed or polymerized to wrap a layer of soft material around interior of the product protection groove 11; the function of the soft material is to prevent the product protection groove 11 from scratching the contact surface of protected product therewith, and the soft material can be wrapped through rubber-coating or affixing or polymerization process; at this time, the first connecting holes 14, support holes 16, and the first reinforcing ribs 12 all provide gripping forces for the soft rubber coating to ensure the stability of the rubber coating layer, which is not easy to fall off.

As a specific technical solution of this embodiment, in said S2, a plurality of first reinforcing ribs 12 and second reinforcing ribs 13 are provided on inner and outer walls of the buffer cover 1; a plurality of first reinforcing ribs 12 are connected to each other to one entirety, a plurality of second reinforcing ribs 13 are connected to each other to one entirety, and a plurality of grooves are provided between a plurality of first reinforcing ribs 12 and between a plurality of second reinforcing ribs 13.

As a specific technical solution of this embodiment, in said S3, in the product protection groove 11 of the buffer cover 1 is provided with a plurality of first connecting holes 14 and support holes 16, in each of four corners of the buffer cover 1 is provided with at least one second connecting hole 15, inner and outer walls on two sides of the cavity are supported via the support holes 16, first connecting holes 14 and second connecting holes 15; in said S4, the inner wall of the product protection groove 11 is rubber-coated or affixed or polymerized with soft material to soften the inner wall in contact with the product so as to protect surface of the product to be protected from being scratched; the buffer cover is used for illustrate, and the claims include but are not limited to buffer cover, buffer plate, buffer corner, edge, and all kinds of regular or special-shaped buffer products, or other products that can be put into practice.

The synthesis of the above process can achieve the following results: the internal hollow double-wall structure plays a good buffer role, when the outer wall made of ductile material is deformed inwards by impact of external force, the reactive force will offset impact of external force to achieve buffer effect; it only needs to measure the strength of the outer wall and the hollow distance between the outer and inner walls to ensure that the deformation process of the outer wall does not affect the inner wall to realize protection of the product; first reinforcing ribs 12 and second reinforcing ribs 13 are added to the inner and outer walls to produce a good wall planar strengthening effect, therefore, to achieve the same effect, the wall thickness can be made much thinner, at the same time, the product is softened and material is saved; first connecting holes 14, second connecting holes 15, and support holes 16 can better support the inner and outer walls, and longitudinally strengthen the buffer cover 1, so that the wall thickness can be further reduced, the product is further softened, material is further saved, and further enhance impact resistance of the product; further, the connecting holes and support holes can also be made into counter bores, and strength of the buffer cover 1 can be adjusted by adjusting the size, density, and depth of holes; in order to further soften the product protection groove 11 in contact with the protected product, in the interior of the product protection groove 11 is wrapped with soft rubber or other soft material 18, which can realize or even beyond foam-like soft inner side, so that the product can replace almost all the foam packaging protection field; since the product can increase the wall thickness to increase the strength, it can further protect the heavy products that cannot be protected by foam.

In conclusion, for double-layer cushioning structure and a preparation process thereof, hollow double-wall structure in the buffer cover 1 play a good buffer role, when an outer wall is deformed inwards by impact of external force, the reactive force will offset impact of external force to achieve buffer effect; arrangement of first reinforcing ribs 12 and second reinforcing ribs 13 strengthens strength of inner and outer walls, thereby wall thickness can be reduced to realize same effect, and saving processing materials; arrangement of first connecting holes 14, second connecting holes 15, and support holes 16 between the inner and outer walls can better support the inner and outer walls, and longitudinally strengthen the buffer cover 1, and further ensure overall structural strength of the buffer cover 1, thereby further reducing wall thickness, softening product, saving materials, and reducing processing costs; soft material 18 is provided on a wall surface of a product protection groove 11, to further soften wall surface that is in contact with the product being protected, and is used to protect surface of the product from being scratched.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A double-layer cushioning structure, comprising a buffer cover, wherein the buffer cover is a double-wall structure, and a cavity is provided between the double walls of the buffer cover; one side of the buffer cover is provided with a product protection groove, an inner wall of the product protection groove is provided with first reinforcing ribs, and an other side of the buffer cover is provided with second reinforcing ribs; the product protection groove is provided with a plurality of first connecting holes, and the buffer cover is provided with a plurality of second connecting holes and a plurality of support holes; the inner wall of the product protection groove is one of affixed, rubber-coated and polymerized with a layer of soft material.

2. The double-layer cushioning structure of claim 1, wherein a shape of the product protection groove can be one of square, round, oval and polygonal.

3. The double-layer cushioning structure of claim 1, wherein the product protection groove is shaped as one or more of concave, flat and convex.

4. The double-layer cushioning structure of claim 1, wherein in each of four corners of the buffer cover is provided with at least one of the second connecting holes, the second connecting holes and the first connecting holes are both either through holes or counter bores.

5. The double-layer cushioning structure of claim 1, wherein two buffer covers can be arranged in opposite positions, so that the product protection groove of the buffer covers are connected into one entirety.

6. The double-layer cushioning structure of claim 1, wherein the support holes are provided in an interior of the product protection groove; the support holes, second connecting holes and first connecting holes are used to support the double walls of the buffer cover, the buffer cover is made of ductile material, the support holes, the second connecting holes and the first connecting holes are shaped in one of round, square and polygonal shapes, and all of the support holes, the second connecting holes and the first connecting holes are one of through holes or counter bores;

the first reinforcing ribs are located in the inner wall of the product protection groove, and the second reinforcing ribs are located in an outer wall of the buffer cover;

there are a plurality of the first reinforcing ribs, the second reinforcing ribs, and the support holes, a plurality of the first reinforcing ribs being connected to each other to one entirety and a plurality of the second reinforcing ribs being connected to each other to one entirety;

a periphery of the buffer cover is inwards concaved into a curved surface.

7. The double-layer cushioning structure of claim 1, wherein stepped grooves are provided on a curved surface of a periphery of the buffer cover.

8. A process for preparing the double-layer cushioning structure of claim 1, comprising the following steps:

Step 1, blow molding the double-wall structure; matched raw materials to be blow molded are blow molded by utilizing a blow mold matching the shape of the buffer cover, to obtain a double-wall structure matching the shape of a product to be packaged, which is a packaging product with cushioning function;

Step 2, provision of the reinforcing ribs on inner and outer wall surfaces, the first reinforcing ribs; and second reinforcing ribs are provided on inner and outer walls of the blow-molded buffer cover, respectively;

Step 3, arrangement of the connecting holes between the inner and outer walls, and the first connecting holes, second connecting holes, and the support holes are set inside the blow-molded buffer cover;

Step 4, provision of soft material on inside wall of the double-wall structure, after the buffer cover is blow molded, soft material can be one of rubber-coated, affixed and polymerized to wrap a layer of soft material on an interior of the product protection groove.

9. The double-layer cushioning structure of claim 8, wherein in the step 2, a plurality of the first reinforcing ribs and second reinforcing ribs are provided on inner and outer walls of the buffer cover; a plurality of the first reinforcing ribs are connected to each other to one entirety, a plurality of the second reinforcing ribs are connected to each other to one entirety, and a plurality of grooves are provided between a plurality of the first reinforcing ribs and between a plurality of the second reinforcing ribs.

10. The double-layer cushioning structure of claim 8, wherein in the Step 3, the product protection groove of the buffer cover is provided with a plurality of the first connecting holes and the support holes, in each of four corners of the buffer cover is provided with at least one of the second connecting holes, inner and outer walls on two sides of the cavity are supported via the support holes, the first connecting holes and the second connecting holes;

in the Step 4, inner wall of the product protection groove is one of rubber-coated, affixed and polymerized with soft material to soften the inner wall in contact with the product so as to protect a surface of the product to be protected from being scratched.

\* \* \* \* \*